(12) United States Patent
Furuki

(10) Patent No.: US 7,421,195 B2
(45) Date of Patent: Sep. 2, 2008

(54) APPARATUS FOR ACQUIRING FOCUSSING INFORMATION AND METHOD OF ACQUIRING FOCUSING INFORMATION

(75) Inventor: Satoko Furuki, Hachioji (JP)

(73) Assignee: Olympus Corporation, Tokyo (JP)

( * ) Notice: Subject to any disclaimer, the term of this patent is extended or adjusted under 35 U.S.C. 154(b) by 76 days.

(21) Appl. No.: 11/639,735

(22) Filed: Dec. 15, 2006

(65) Prior Publication Data

US 2007/0132861 A1    Jun. 14, 2007

Related U.S. Application Data

(63) Continuation of application No. PCT/JP05/11291, filed on Jun. 20, 2005.

(30) Foreign Application Priority Data

Jun. 21, 2004   (JP) .............................. 2004-182513

(51) Int. Cl.
*G03B 3/00* (2006.01)

(52) U.S. Cl. ...................... 396/125; 396/127; 396/147; 348/231.3; 348/345; 348/346; 348/347; 348/348; 348/349; 348/350; 348/351; 348/352; 348/353; 348/354; 348/355; 348/356; 348/357; 356/4.03; 356/4.04; 356/624

(58) Field of Classification Search ................. 396/125, 396/127, 147; 348/231.3, 345–357; 356/4.03, 356/4.04, 624
See application file for complete search history.

(56) References Cited

U.S. PATENT DOCUMENTS

| 4,255,028 A | * | 3/1981 | Aoki ........................... 396/127 |
| 4,716,431 A | * | 12/1987 | Shindo ........................ 396/114 |
| 4,812,636 A | * | 3/1989 | Kusaka et al. ............. 250/201.7 |
| 4,965,840 A | | 10/1990 | Subbarao |

(Continued)

FOREIGN PATENT DOCUMENTS

JP        3-136580 A        6/1991

(Continued)

OTHER PUBLICATIONS

Notification Concerning Transmittal of Copy of International Preliminary Report on Patentability, Chapter I of the Patent Cooperation Treaty, and Written Opinion of the International Searching Authority, dated Jan. 11, 2007, for PCT/JP2005/011291, 5 sheets.

*Primary Examiner*—W. B. Perkey
*Assistant Examiner*—Warren K Fenwick
(74) *Attorney, Agent, or Firm*—Frishauf, Holtz, Goodman & Chick, P.C.

(57) ABSTRACT

A storage unit is configured to store beforehand a table that shows a relation between spread parameters and command values supplied to a control unit to acquire a focused image of an object, and information that designates a command value corresponding to an inflection point on an approximated curve showing the relation that the spread parameters have with the command values, the control unit being configured to control a state of an optical system in accordance with an input command value. The luminance information about the object that lies at a distance falling within a range over which focusing should be detected is acquired, at the position of the optical system, which is obtained by the command value corresponding to the inflection point shown in the table.

18 Claims, 11 Drawing Sheets

U.S. PATENT DOCUMENTS

| | | | |
|---|---|---|---|
| 5,367,153 A * | 11/1994 | Suda et al. | 250/201.8 |
| 5,369,461 A * | 11/1994 | Hirasawa et al. | 396/135 |
| 5,448,051 A * | 9/1995 | Yamano | 250/201.2 |
| 5,825,456 A * | 10/1998 | Tabata et al. | 351/201 |
| 2005/0063694 A1* | 3/2005 | Nakazawa | 396/97 |
| 2005/0068428 A1* | 3/2005 | Uchida | 348/231.3 |
| 2005/0193124 A1 | 9/2005 | Chou et al. | |

FOREIGN PATENT DOCUMENTS

| | | |
|---|---|---|
| JP | 6-181532 A | 6/1994 |
| JP | 8-9231 A | 1/1996 |
| JP | 11-295588 A | 10/1999 |
| JP | 2000-199845 A | 7/2000 |
| JP | 2000-338385 A | 12/2000 |
| JP | 2004-4923 A | 1/2004 |

* cited by examiner

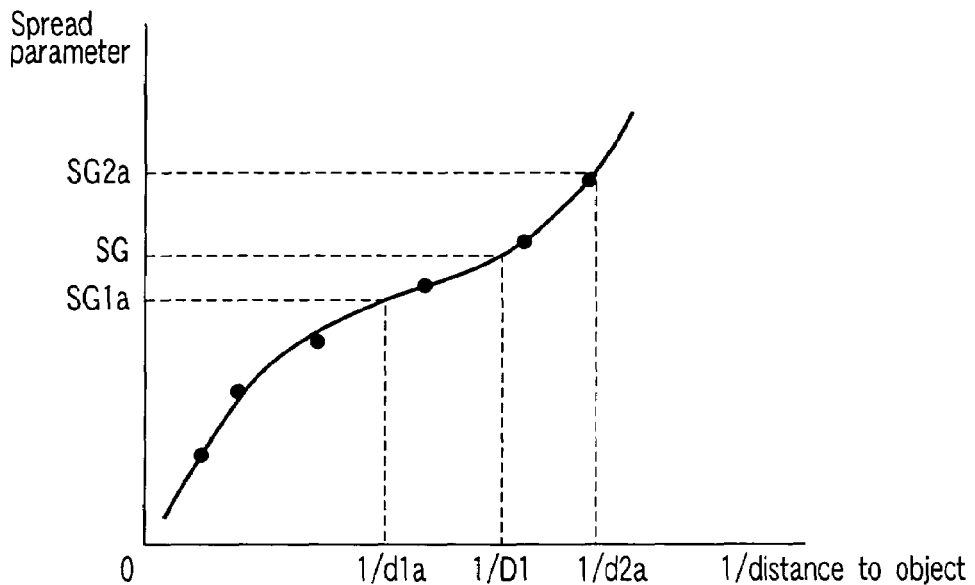
F I G. 10A
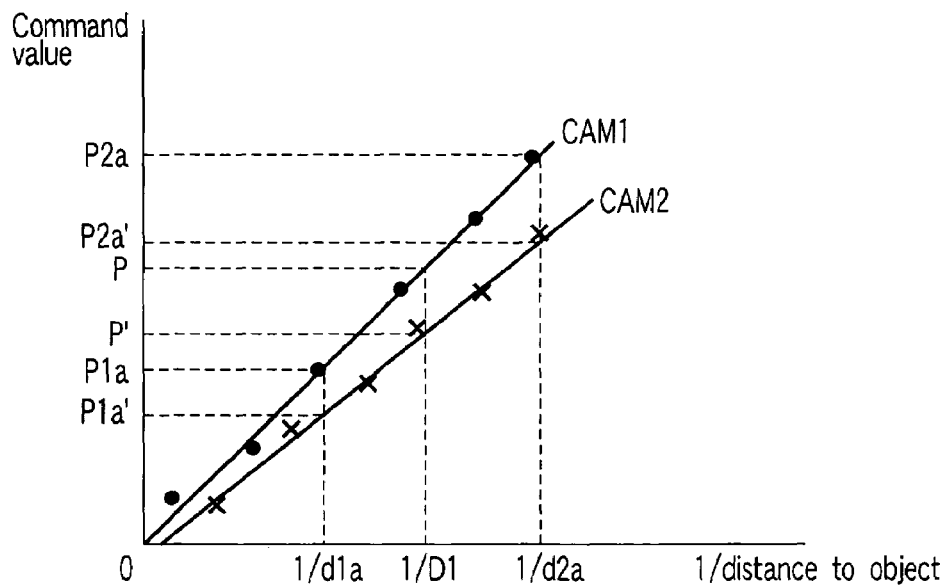
F I G. 10B

APPARATUS FOR ACQUIRING FOCUSSING INFORMATION AND METHOD OF ACQUIRING FOCUSING INFORMATION

CROSS-REFERENCE TO RELATED APPLICATIONS

This is a Continuation Application of PCT Application No. PCT/JP2005/011291, filed Jun. 20, 2005, which was published under PCT Article 21(2) in Japanese.

This application is based upon and claims the benefit of priority from prior Japanese Patent Application No. 2004-182513, filed Jun. 21, 2004, the entire contents of which are incorporated herein by reference.

BACKGROUND OF THE INVENTION

1. Field of the Invention

The present invention relates to an apparatus and method for acquiring focusing information, in which focusing is detected from several images different in unclearness, with reference to the command values and the database of spread parameters, the command values having been supplied to a drive unit to establish a focusing state already stored 2. Description of the Related Art U.S. Pat. No. 4,965,840 discloses a focusing detecting method using a DFD (depth-from-defocus). This method acquires luminance information at two sites having different optical-path lengths. Data representing a plurality of images that differ in unclearness is processed, thereby calculating a spread parameter and determining focusing.

"Spread parameter" is a representative value representing the unclearness of luminance information. This value is correlated to the distribution of point-spread functions in an optical system. "Point spread function" is a function that represents the spread of light that takes place when an ideal point image passes through the optical system.

"Luminance information" is a numerical value for the amount of light per unit area in an optical image. The luminance information is acquired by a photoelectric transducer (1 pixel) that has a photoelectric conversion function, or by an image sensor than comprises a plurality of photoelectric transducers. The luminance information acquired by a monochrome image sensor is a sensor signal information per se. The luminance information acquired by a color image sensor is signal information items that the color filters obtain for the respective bands. It may be signal information items for R, G and B, respectively. Otherwise, it may be information obtained by synthesizing the signal information items. The signal information is not limited to a particular format. It may be ordinary image information acquired by an area type sensor and representing a two-dimensional image, a combination of image information items linearly arranged, one-dimensional image information acquired by a line-type sensor, or one-point information acquired by a one-segment imaging element.

U.S. Pat. No. 4,965,840 discloses a focusing detecting method using DFD. The steps of this method will be explained briefly. The data processing performed in these steps will not be described here, because it is described in detail in U.S. Pat. No. 4,965,840.

In the focusing detecting method using DFD, at least two luminance information items for determining the focusing are acquired from the same object, the same position and the same line of sight, by changing at least one photographing parameter that influences the unclearness of the image photographed. Several photographing parameter are available. They are the position of the focus lens, opening of the diaphragms, focal length, and the like. Here, it will be descried only how the position of the focus lens is changed. It limits, when changing only the position of a focus lens, and this explanation explains.

In this focusing detecting method using DFD, the focus lens is moved to a first predetermined position and then to a second position, in order to change the length of the optical path between an imaging unit and an object. First luminance information and second luminance information are thereby acquired. Normalization is performed on these luminance information items, thus normalizing the image magnification, luminance distribution, and the like. Any part of the luminance information for determining whether the part is well focused or not is selected, as needed. This selection is performed for only one luminance information item acquired. In the part of the other luminance information item, a corresponding part is selected according to the selected part of the first-mentioned luminance information. The first and second items of luminance information items contain electrical noise. Therefore, preliminary operations are performed on those parts of the first and second items of luminance information, the preliminary operations including an operation for noise elimination and an operation for calculating a spread parameter. The results of the preliminary operations are combined. Thereby, the spread parameter corresponding to the first or second items of luminance information are calculated.

The spread parameter thus calculated is related to the command value for driving an actuator that moves the focus lens to achieve focusing in accordance with this parameter. A table showing the correspondence of the parameter and the command value has been already prepared. Hence, if the spread parameter acquired is checked against the correspondence table, the command value for driving the actuator can therefore be generated.

BRIEF SUMMARY OF THE INVENTION

According to a first aspect of the present invention, there is provided an apparatus for acquiring focusing information, comprising:

an optical system configured to focus light coming from an object, at a predetermined position, in order to photograph the object and acquire a focused image of the object;

a luminance-information acquiring unit configured to acquire luminance information items about corresponding regions of at least two of a plurality of images which differ in unclearness and which have been formed by the light that has passed through at least one part of the optical system;

a control unit configured to control a state of at least one of the optical system and the luminance-information acquiring unit in accordance with an input command value;

a spread-parameter calculating unit configured to calculate a spread parameter from a plurality of luminance information items acquired by the luminance-information acquiring unit;

a storage unit configured to store a table that shows a relation between spread parameters and command values supplied to the control unit to acquire a focused image of the object, and information that designates a command value corresponding to an inflection point on an approximated curve showing the relation that the spread parameters have with the command values; and a command-outputting unit configured to output the command value to the control unit in order to acquire a focused image of the object, by using the spread parameter calculated by the spread-parameter calculating unit and the table stored in the storage unit, at least one of the luminance information items acquired by the luminance-information acquiring unit having been acquired under a specific condition established by inputting to the control unit the command value corresponding to the inflection point that is designated on the basis of the information stored in the storage unit.

According to a second aspect of the present invention, there is provided an apparatus for acquiring focusing information, comprising:

an optical system configured to focus light coming from an object, at a predetermined position, in order to photograph the object and acquire a focused image of the object;

a luminance-information acquiring unit configured to acquire luminance information items about corresponding regions of at least two of a plurality of images which differ in unclearness and which have been formed by the light that has passed through at least one part of the optical system;

a control unit configured to control a state of at least one of the optical system and the luminance-information acquiring unit in accordance with an input command value;

a spread-parameter calculating unit configured to calculate a spread parameter from a plurality of luminance information items acquired by the luminance-information acquiring unit;

a storage unit configured to store a table that shows a relation between spread parameters and command values supplied to the control unit to acquire a focused image of the object, and information that designates a command value corresponding to a point on one of an approximated curve and an approximate line showing the relation that the spread parameter has with the command values, the spread parameter having a minimum absolute value at the point; and a command-outputting unit configured to output the command value to the control unit in order to acquire a focused image of the object, by using the spread parameter calculated by the spread-parameter calculating unit and the table stored in the storage unit, at least one of the luminance information items acquired by the luminance-information acquiring unit having been acquired under a specific condition established by inputting to the control unit the command value corresponding to the point at which the spread parameter designated on the basis of the information stored in the storage unit has the minimum absolute value.

According to a third aspect of the present invention, there is provided a method of acquiring focusing information, comprising:

acquiring luminance information items about corresponding regions of at least two of a plurality of images which differ in unclearness and which have been formed by light that has passed through at least one part of an optical system which focuses light coming from an object, at a predetermined position, in order to photograph the object and acquire an focused image of the object;

calculating a spread parameter from a plurality of luminance information items thus acquired;

storing beforehand a table that shows a relation between spread parameters and command values supplied to a control unit to acquire a focused image of the object, and information that designates a command value corresponding to an inflection point on an approximated curve showing the relation that the spread parameters have with the command values, the control unit being configured to control a state of at least one of the optical system and the acquiring luminance information items, in accordance with an input command value; and outputting the command value to the control unit in order to acquire a focused image of the object, by using the spread parameter thus calculated and the table stored beforehand, at least one of the luminance information items acquired in the acquiring luminance information items being an item acquired under a specific condition established by inputting to the control unit the command value corresponding to the inflection point that is designated on the basis of the information stored beforehand.

According to a forth aspect of the present invention, there is provided a method of acquiring focusing information, comprising:

acquiring luminance information items about corresponding regions of at least two of a plurality of images which differ in unclearness and which have been formed by light that has passed through at least one part of an optical system which focuses light coming from an object, at a predetermined position, in order to photograph the object and acquire an focused image of the object;

calculating a spread parameter from a plurality of luminance information items thus acquired;

storing beforehand a table that shows a relation between spread parameters and command values supplied to a control unit to acquire a focused image of the object, and information that designates a command value corresponding to a point on one of an approximated curve and an approximate line showing the relation that the spread parameters have with the command values, the spread parameter having a minimum absolute value at the point, and the control unit being configured to control a state of at least one of the optical system and the acquiring luminance information items, in accordance with an input command value; and outputting the command value to the control unit in order to acquire a focused image of the object, by using the spread parameter thus calculated and the table stored beforehand, at least one of the luminance information items acquired in the acquiring the luminance information items having been acquired under a specific condition established by inputting to the control unit the command value corresponding to the point at which the spread parameter designated on the basis of the information stored beforehand has the minimum absolute value.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10A is a graph representing the relation between a spread parameter and the reciprocal of the distance from an object, the relation being stored as a table in a control-system storage unit in a second embodiment of the present invention;

FIG. 10B is a graph representing the relation between the reciprocal of the distance from an object and the command value supplied to the drive unit, the relation being stored as a table in the control-system storage unit in the second embodiment;

DETAILED DESCRIPTION OF THE INVENTION

The preferred embodiments of the present invention will be described below with reference to the accompanying drawings.

First Embodiment

This embodiment will be described, which is limited to a configuration in which the position of a focus lens is changed and an imaging unit obtains unclear images.

Figure 1A:
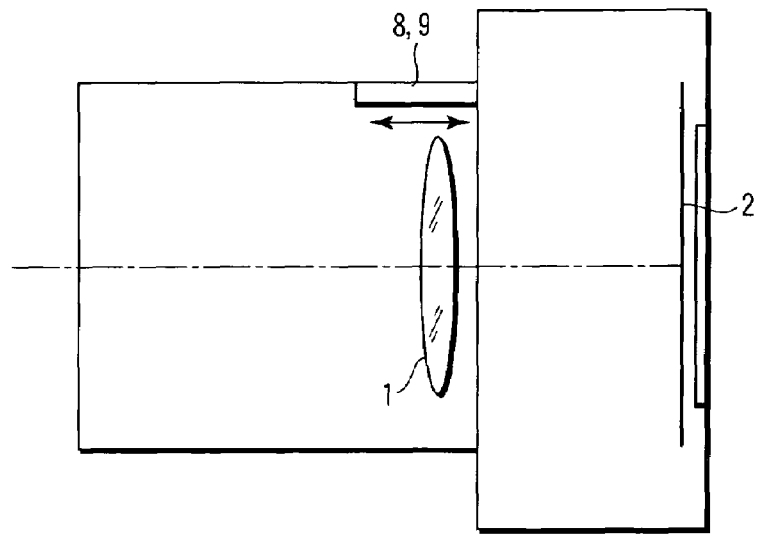
FIG. 1A is a diagram showing the arrangement of the optical configuration of a digital camera that incorporates and uses an apparatus and method of acquiring focusing information according to a first embodiment of this invention.
Figure 1B:
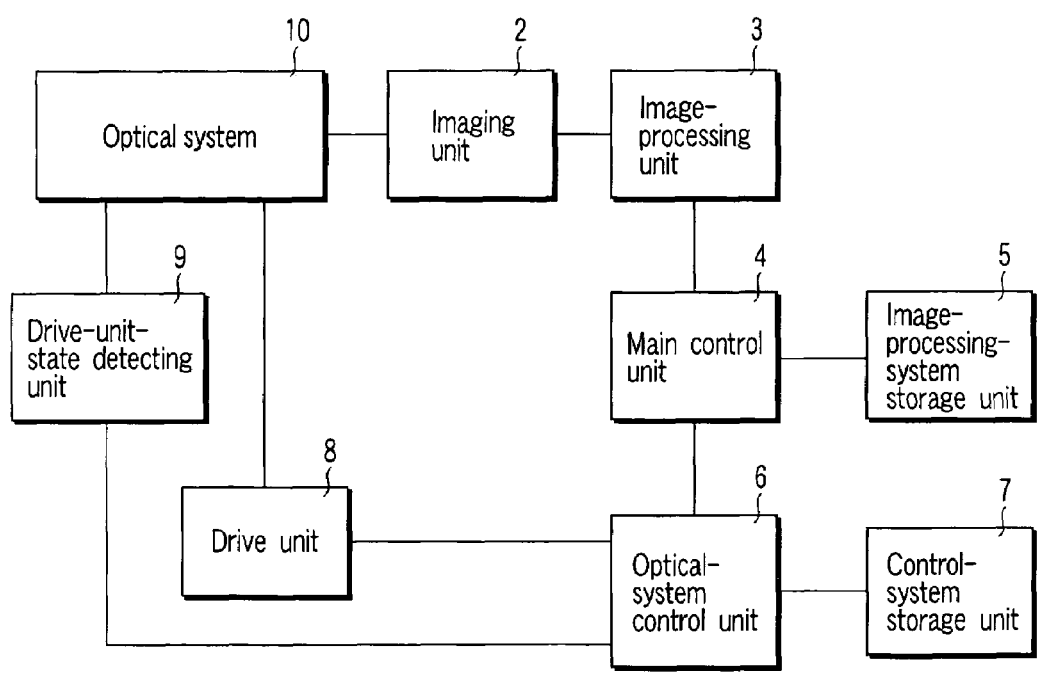
FIG. 1B is a block diagram of the digital camera of FIG. 1A.

FIGS. 1A and 1B show a digital camera that has and uses an apparatus and method for acquiring focusing information, according to the first embodiment of the invention. As shown in FIG. 1A and FIG. 1B, the digital camera comprises an optical system 10 including a focus lens 1, an imaging unit 2 and an image-processing unit 3 which are functioned as a luminance-information acquiring unit, a main control unit 4 which is functioned as a spread parameter calculating unit, an image-processing-system storage unit 5, an optical-system control unit 6 which is functioned as a command-outputting unit, a control-system storage unit 7 which is functioned as a storage unit, and a drive unit 8 and a drive-unit-state detecting unit 9 which are functioned as a control unit.

The drive unit 8 comprises an actuator, a circuit and a lens barrel, which are not shown. The actuator is, for example, a motor. The circuit generates signals for driving the actuator. The lens barrel couples the actuator to the optical system 10. The drive unit 8 operates the lens barrel that couples the actuator to the focus lens 1 in the optical system 10, therefore, drives the focus lens 1 and controls the position of the focus lens 1. When the position of the focus lens 1 is thus controlled, the length of the optical path from the imaging unit 2 to an object can be adjusted. The imaging unit 2 can focus to the object at a given distance. The position of focus lens 1 is determined from the position of the component of the drive unit 8, which the actuator state detection unit 9 has detected.

Figure 2:
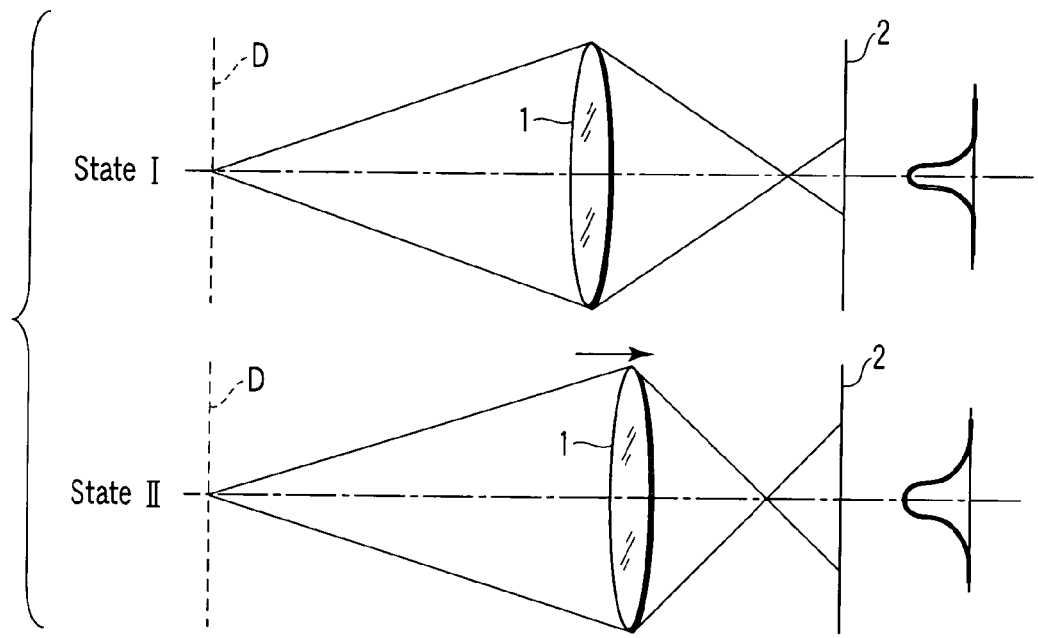
FIG. 2 is a diagram explaining how the focus lens is changed in position.

To acquire the luminance information for detecting a focusing, the drive unit 8 is used, moving the focus lens 1 to the first position (State I) and then to the second position (State II) as shown in FIG. 2. The imaging unit 2 receives a first image and a second image. The Imaging unit 2 translates the amount of light it has received into an electric charge. The image-processing unit 3 converts the electric charge to a digital signal. The digital signal is supplied via the main control unit 4 and stored, as luminance information, in the image-processing-system storage unit 5. In this embodiment, the imaging unit 2 receives the image data acquired at the time of proper photographing. The data representing the image data is stored in the image-processing-system storage unit 5 in the same way as described above. "Proper photographing" means the process of recording the image of the object in the form of two-dimensional information. Namely, the proper photographing is recording the data representing a focused image of the object the user has photographed.

The configuration described above can select a focusing detection area in the region to be photographed by the imaging unit 2. The main control unit 4 reads from the image-processing-system storage unit 5 the two luminance information items acquired to achieve focus detection. The main control unit 4 calculates a value that correlated with the distribution of point spread functions, from the two luminance information items to obtain a spread parameter from the value it has calculated. This process may be performed by the method disclosed in U.S. Pat. No. 4,965,840. Instead, the process may be performed by any other method.

The table stored in the control-system storage unit 7 will be explained. The control-system storage unit 7 stores a table showing command values and discrete values of spread parameters corresponding to the command values. The command values will be supplied to the drive unit 8. In accordance with these values, the drive unit 8 moves the focus lens so that the imaging unit 2 may accomplish in focus. From the table stored in the unit 7, the optical-system control unit 6 can calculate the commend value that corresponds to the spread parameter calculated by the main control unit 4. This command value will be used to accomplish in focus. Therefore, an operation is easy and the time concerning focus detection can be shortened. The operation is easy, shortening the time required to detect the focusing.

"Command value" is a target value for making a predetermined position drive focus lens 1. A command value shows the absolute position from the reference position defined beforehand. The absolute position is, for example, a certain position from the reference position for the focus lens 1 or for the lens barrel to which focus lens 1 is attached, for example. An approximated curve is defined for the discrete values of the spread parameter. Then, inflection point $SG1a$ can be set for the command values. Since the discrete values are so stored, this embodiment works well even if the relation between the command values and the spread parameters is complicated.

Figure 4:
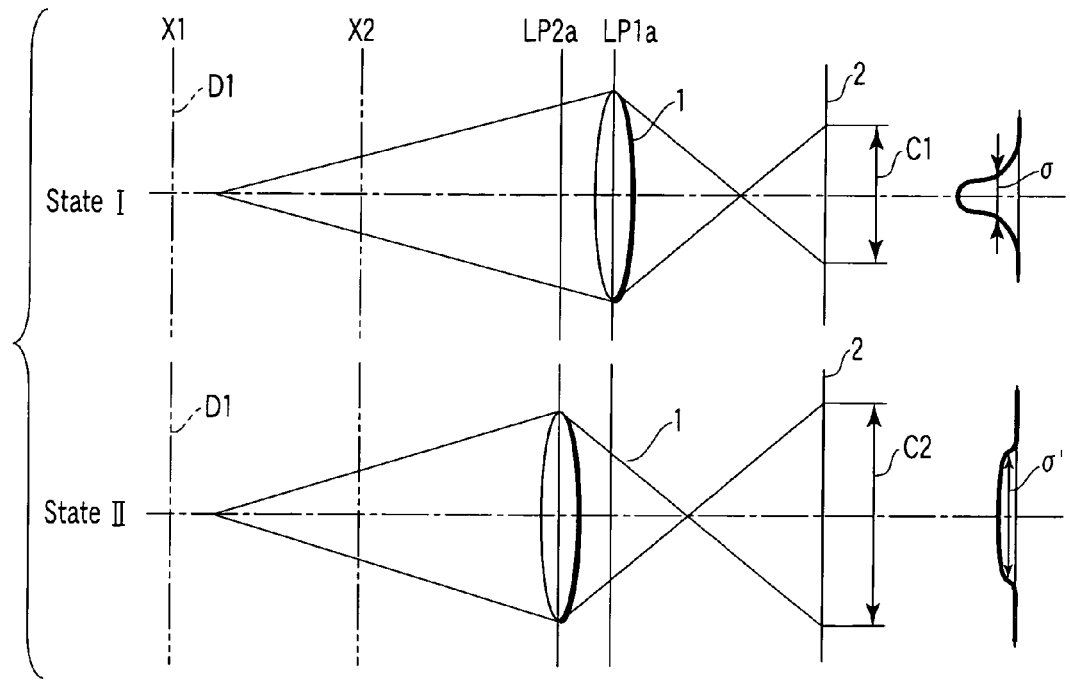
FIG. 4 is a diagram explaining two point-spread functions, one for the case where the unclearness of the luminance information falls within an allowable range, and the other for the case where the unclearness of the luminance information is too large.
Figure 5:
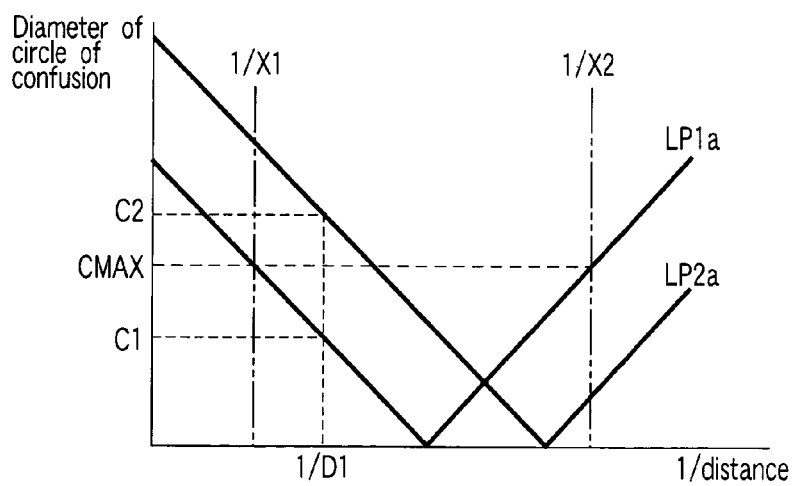
FIG. 5 is a graph representing the relation between the unclearness of luminance information and the reciprocal of the distance to the object, the luminance information having been acquired by inputting to a drive unit a command value that corresponds to an inflection point.
Figure 6A:
FIG. 6A is a diagram showing optical noise in the imaging unit.
Figure 6B:
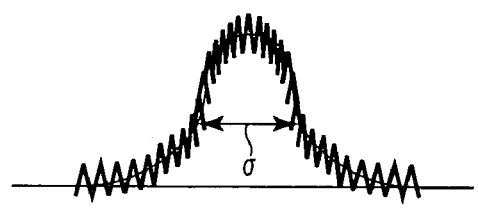
FIG. 6B is a diagram showing a point-spread function that is superimposed with the noise shown in FIG. 6A in case where the unclearness of the luminance information falls within the allowable range.

The luminance information is acquired at two focus lens positions. One focus lens position is position $LP1a$ (FIG. 4) obtained by inputting, to the actuator 8, command value $P1a$ corresponding to the inflection point $SG1a$. The unclearness of the luminance information acquired at position of $LP1a$ is related to the reciprocal of the distance to the object, as is illustrated in FIG. 5. The focusing should be detected for only a limited distance between X1 and X2 shown in FIG. 5, the focusing detection is performed for an object D1 existing between X1 and X2. At this time, the unclearness acquired at focus lens position $LP1a$ is C1. That is, the unclearness falls within the range of allowed value CMAX shown in FIG. 5. The point spread function that shows the degree to which the image has been focused represents State I shown in FIG. 4. The main control unit 4 calculates spread parameter SG that is correlated to $\sigma$ shown in FIG. 4 (the distribution of the point spread function). In practice, electric noise develops in the imaging unit 2 as shown in FIG. 6A. Therefore, the point-spread function detected in the imaging unit 2 changes to one shown in FIG. 6B. Spread parameter SG has resulted from distribution $\sigma$ of the point-spread function. The ratio of the noise to the point-spread function is therefore small. Hence, spread parameter SG can be computed, without being influenced by the noise so much.

Figure 3:
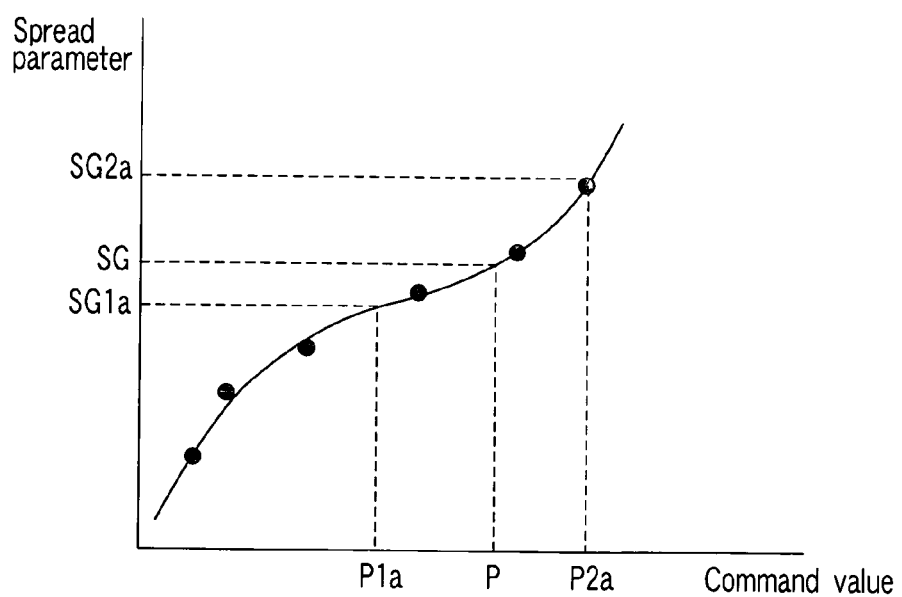
FIG. 3 is a graph representing the relation between a command value and the discrete value of a spread parameter, the command value being supplied to a drive unit to obtain a focus lens position for attaining in focus state of an imaging unit, and the spread parameter corresponding to the command value.
Figure 6C:
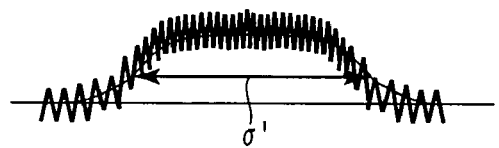
FIG. 6C is a diagram showing a point-spread function that is superimposed with the noise shown in FIG. 6A in case where the unclearness of the luminance information is too large.

Command value $P2a$ corresponding to point $SG2a$ (FIG. 3), which is not a position of point-of-inflection $SG1a$ of FIG. 3, may be given to the drive unit 8. In this case, in State II shown in FIG. 4, the focus lens 1 is arranged at position of $LP2a$. The unclearness of the luminance information acquired at this position has relation $LP2a$ (FIG. 5) to the reciprocal of the distance to the object. If an image of the object, located at distance D1, is obtained in State II (FIG. 4), the unclearness will be C2. This unclearness is much exceeds allowed value CMAX. If the electric noise of the imaging unit 2 is taken into consideration, the point-spread function obtained will becomes as shown in FIG. 6C. The ratio of the noise to the point spread function is large. The noise has imposes a prominent influence on the calculation of spread parameter SG'.

Therefore, if the luminance information acquired by arranging the focus lens at position $LP1a$ is used, the noise will impose no prominent influence on the calculation of the spread parameter. This prevents the failure of calculation. Spread parameter SG calculated is input to the optical-system control unit 6 which is functioned as command-outputting unit. The optical-system control unit 6 calculates command value P for acquiring an in focus state, from the table (FIG. 3) stored in the control-system storage unit 7.

In this embodiment, the focus lens 1 is moved to acquire luminance information items, each representing the unclearness of an image. The diameter of the diaphragm (not shown) incorporated in the optical system 10 may be changed to acquire different luminance information items. Alternatively, the lens may be changed in shape, if made of fluid, to have a different refractive index, therefore obtaining luminance information items about optical paths of different lengths. From these luminance information items, a spread parameter may be calculated. It suffices to change at least one of the lens position, the diaphragm diameter and the refractive index of the lens. Two or more of these items may be changed at the same time.

The optical system 10 is constituted by a group of lenses, including a zoom lens and a focus lens 1, a diaphragm, a light filter, and the like. If the camera is a single-lens reflex camera, optical system 10 also contains optical elements, such as a reflex mirror.

The imaging unit 2 may have an imaging element separately in focus detection. The imaging element may be any type available. It may be CCD, a CMOS sensor, or a one-dimensional line sensor.

The main control unit 4 is a microprocessor that performs data processing. Two or more main control units 4 may exist used, depending on the amount of data that should be processed. The main control unit 4 can be constituted by ASIC, FPGA, or the like.

The optical-system control unit 6 has means for processing data to control the driving circuit of drive unit 8.

The image-processing-system storage unit 5 and control-system storage unit 7 may be nonvolatile memory devices or the like. They may be exchangeable memory. Alternatively, they may be constituted by one and the same memory device.

An electromagnetic motor, a piezoelectric element, an ultrasonic-driven motor, or the like constitutes the drive unit 8.

The drive-unit-state detecting unit 9 is a sensor that detects the speed, angular velocity, position, temperature, pressure, and amount of light of the drive unit 8. The unit 9 is constituted by a gyro sensor, an encoder, an accelerometer, a thermometer, a manometer, a light-receiving element for measuring the quantity of light, and the like.

In the first embodiment, the luminance information about an object that lies at a distance falling within a range over which focusing should be detected is acquired, as described above, at the position of the optical system 10 to the imaging unit 2, which is obtained by a command value corresponding to the inflection point shown in the table. Hence, the unclearness of the information does not exceed the allowable range. As long as the unclearness falls within the allowed range, the point spread function obtained is not be buried in electric noise in the imaging unit 2. Therefore, the spread parameter resulting from distribution of the point spread function can be calculated well.

Only one drive unit 8 is required, because the unclearness can be determined by driving the optical system 10 only. Therefore, space and electric power can be saved.

Modification 1 of the First Embodiment

Figure 7:
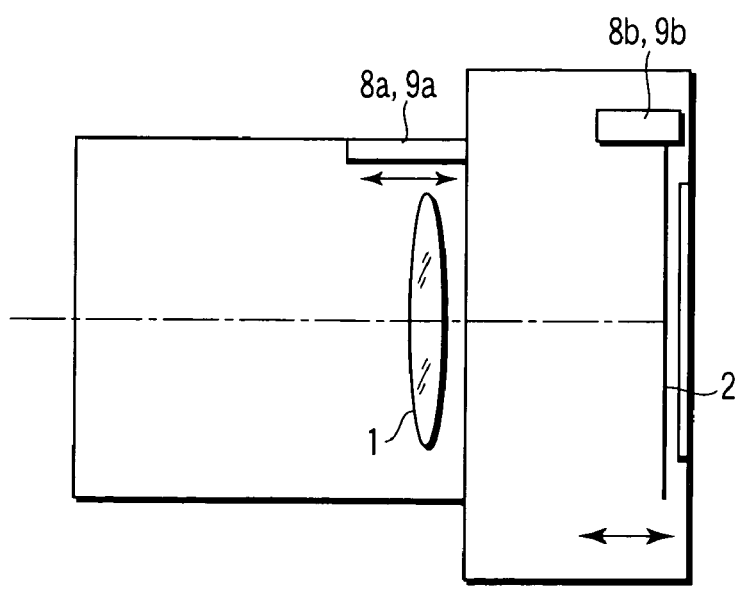
FIG. 7 is a diagram showing the arrangement of the optical configuration of a digital camera in modification a or 2 of the first embodiment of the invention.

In the first embodiment described above, only optical system 10 can be moved. Nonetheless, as shown in FIG. 7, a drive unit $8b$ and a drive-unit-state detecting unit $9b$ may be attached to the imaging unit 2 as shown in FIG. 7. In this case, only the imaging unit 2 can be moved. If imaging unit 2 is driven to two positions, the imaging unit 2 can acquire luminance information items that differ in unclearness. In this case, the control-system storage unit 7 stores a table that shows the relation between a command value for driving imaging unit 2 and a spread parameter.

The imaging unit 2 is arranged at a predetermined position. This position has been determined from the command value input to drive unit 8b and corresponding to a point near the inflection point on the approximated curve of the spread parameter. This position is at a position equivalent to position LP1a of the focus lens and relative position of imaging unit 2 of the first embodiment. The first modification can therefore achieve the same advantage as the first embodiment. Since this system has only one drive unit 8b, space and power can be effectively saved.

Modification 2 of the First Embodiment

The drive units 8a and 8b and the drive-unit-state detecting units 9a and 9b may be attached to the optical system and imaging unit 2 as shown in FIG. 7. In this case, too, the same advantage can be attained. The table stored in the control-system storage unit 7 shows the relation between the command values supplied to the drive units 8a and 8b and the spread parameter.

The command value supplied to drive units 8a and 8b and corresponding to the inflection point on the approximated curve of the spread parameter is executed. The optical system 10 and imaging unit 2 are thereby arranged at certain positions. Luminance information is acquired at these positions. The spread parameter can be therefore calculated, scarcely influenced by noise. Failure of the calculation can be prevented. Even if the distance the optical system 10 can move is limited, focusing information can be obtained within a limited space, by driving both the optical system 10 and the imaging unit 2.

Thus, in the focusing detecting method using DFD, the robust states of the optical system 10 and imaging unit 2 can be selected sequentially.

Modification 3 of the First Embodiment

Figure 8:
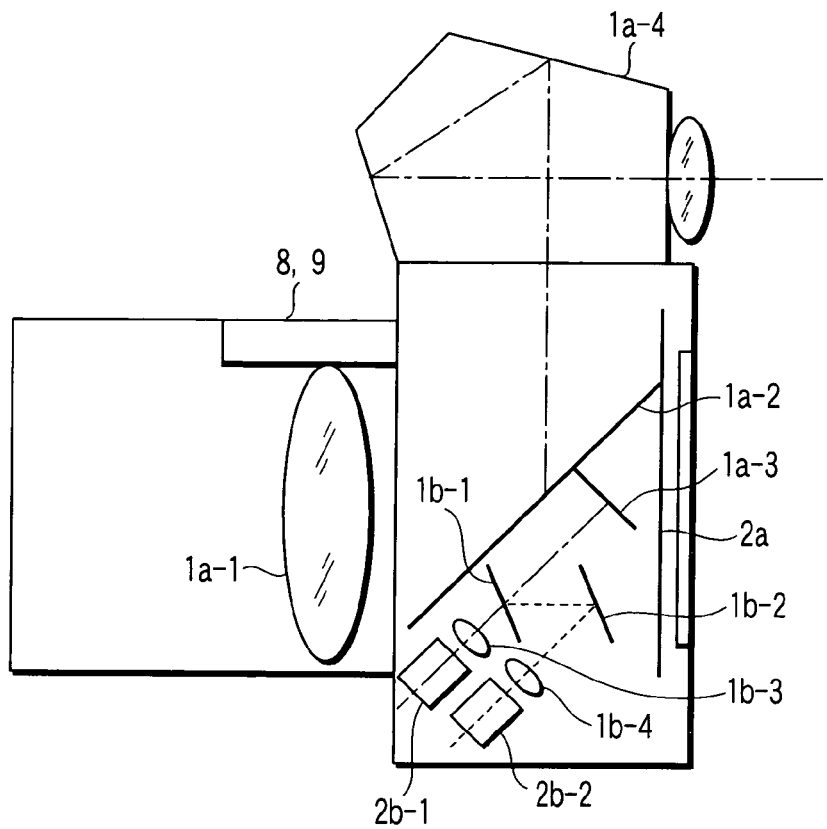
FIG. 8 is a diagram showing the arrangement of the optical configuration of a digital camera in a modification 3 of the first embodiment of the invention.

The camera may be a single-lens reflex camera. In that case, the configuration may be one shown in FIG. 8.

The light that has passed through the focus lens 1a-1 of optical system 10 is reflected by a quick return mirror 1a-2 and guided to a finder optical system 1a-4. The light passes through a part of the quick return mirror. A reflex mirror 1a-3 divides the light that has passed through that part of the mirror 1a-2. Two half mirror 1b-1 and 1b-2 divide the optical path into two paths in order to obtain two images of different path lengths at the same time by two imaging units 2b-1 and 2b-2. This configuration includes another imaging unit 2a, which obtains an image at the time of proper photographing. Note that the imaging unit 2b-1 and 2b-2 are provided to detect focusing. In FIG. 8, 1b-3 and 1b-4 are the condenser lenses for imaging unit 2b-1 and 2b-2, respectively.

The table stored in the control-system storage unit 7 shows the relation between the spread parameter and the command value corresponding to the value of the parameter. The command value is used to move the focus lens to a position where the imaging unit 2a attains an in focus state. Command value P1a corresponding to the inflection point of the spread parameter is input into drive unit 8. The drive unit 8 drives a focus lens 1a-1 to a predetermined position. It suffices for the relative position of one of the imaging units 2b-1 and 2b-2 for detecting focusing and the focus lens 1a-1 to be at the position defined by command value P1a that corresponds to the inflection point on the approximated curve of the spread parameter shown in the table. Luminance information is acquired at this position. The same advantage as descried before can thereby be achieved.

Since imaging units dedicated to the acquisition of focusing information are provided, a plurality of unclearness-luminance information items can be acquired at the same time. As a result, the time required to acquire focusing information can be shortened.

Modification 4 of the First Embodiment

Figure 9:
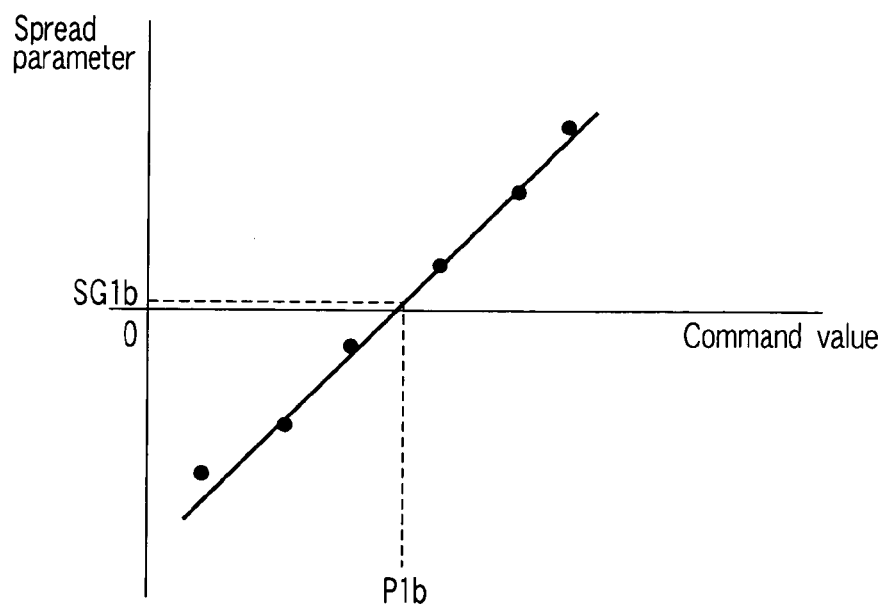
FIG. 9 is a graph showing the relation between a command value and a spread parameter, the relation being stored as a table in a control-system storage unit in a modification 4 of the first embodiment of this invention.

The table stored in the control-system storage unit 7 may have the spread parameter corresponding to the command value supplied to the drive unit 8, the parameter having the minimum absolute value on the approximated curve of the spread parameter shown in FIG. 9.

In this case, the luminance information is acquired by inputting to the drive unit 8 the command value P1b corresponding to the minimum value, thereby setting the focus lens at a predetermined position. By acquiring luminance information in this position, an advantage equivalent to the effect mentioned above is obtained.

Thus, luminance information is acquired about an object at a distance within such a range that focusing is achieved when the optical system 10 and imaging unit 2 are set at the positions defined by the command value P1b that corresponds to a point where the spread parameter has the minimum absolute value on the approximated curve. Therefore, the unclearness of the information is not outside the allowed range. If the unclearness falls within the allowed range, the point spread function obtained will not be buried in the electric noise made in the imaging unit 2. Therefore, the spread parameter resulting from distribution of point spread function is calculated well.

Second Embodiment

A second embodiment of the present invention will be described. A digital camera according to this embodiment is similar in hardware configuration to the first embodiment described above.

That is, in the second embodiment, the focus lens 1 is driven to two positions as in the first embodiment of the above. The lengths of the optical paths to the imaging unit 2 and the object are thereby adjusted to obtain images that differ in unclearness. The luminance information items acquired at these two positions are stored in the image-processing-system storage unit 5. From the two luminance information items, the main control unit 4, i.e., means for calculating parameters, calculates a spread parameter.

In the second embodiment, the control-system storage unit 7 stores a table showing such a relation between such a spread parameter and the reciprocal of the distance to the object, as shown in FIG. 10A, and also a table showing such a relation between the reciprocal of the distance to the object and the command value supplied to the drive unit 8 to attain the in focus state in the imaging unit 2 corresponding to the reciprocal, as shown in FIG. 10B. The relation between the command value and the reciprocal of the distance to the object is different from a product lot to another, as seen from CaM1 and CaM2 shown in FIG. 10B. In view of this, each table is stored, using the parameter-object distance that connects the spread parameter and the command value. This separates the table that changes from a product lot to another, from the table that does not so change. Therefore, an appropriate table can be easily provided to each product.

The former table has an inflection point on the approximated curve of the discrete value of the spread parameter. A command value for focusing at the distance to the object, which corresponds to the inflection point, is input to the drive unit 8.

The focus lens 1 is therefore arranged at a predetermined position LP1a, and luminance information is acquired at this position LP1a. Thus, an advantage equivalent to that of the first embodiment is attained.

In the second embodiment, an inflection point exists on the approximated curve of the discrete value of the spread parameter, as described above. Instead, the table may be one in which the approximated curve has a minimum value.

In the second embodiment, the control-system storage unit 7 stores two tables as described above. Instead, a plurality of intermediate parameters exist, connecting the spread parameter and the command value exist, and the table may be divided into many.

In the second embodiment, the focus lens 1 drives as described above, acquiring two or more unclearness-luminance information items. Instead, the diaphragm diameter may be changed, thereby acquiring luminance information items that differ in value. Alternatively, the lens may be made of fluid and its refractive index may be changed, thereby acquiring luminance information items, for optical paths of different lengths. In either case, a spread parameter can be calculated. It suffices to change at least one of the position of the lens, the diameter of diaphragm and the refractive index of the lens. Of course, two or more of these items may be changed.

Only imaging unit 2 may be driven or the optical system 10 and the imaging unit 2 may be driven in interlock, as shown in the modifications of the first embodiment. Further, the configuration may be desired on the assumption that the camera is a single-lens reflex camera shown in FIG. 8. As described above, in the second embodiment, different tables (spread parameters) are prepared, each for a lot of products. Thereby, a table corresponding to a particular lot can be selected and used. Therefore, the right command value can be assigned, on the basis of the spread parameter calculated.

Third Embodiment

Figure 11:
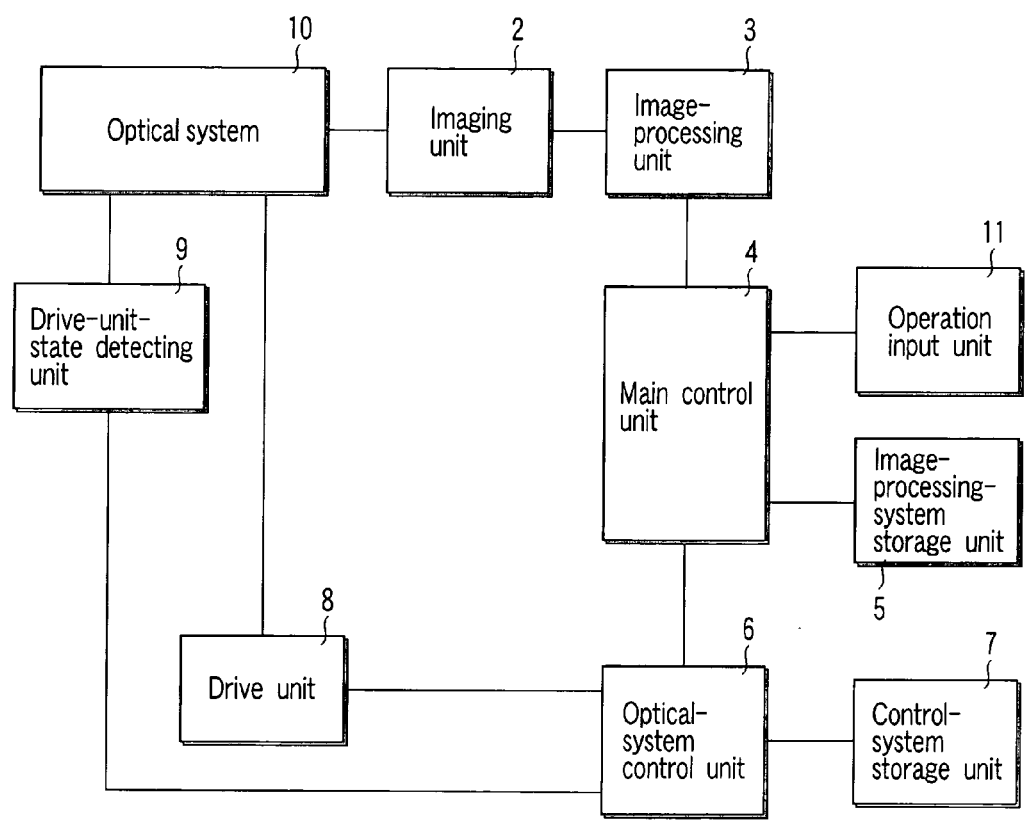
FIG. 11 is a block diagram of a digital camera that incorporates and uses an apparatus and method of acquiring focusing information, according to a third embodiment of the present invention.

FIG. 11 shows the configuration of the digital camera that uses the focusing information acquisition device and focusing information acquisition method concerning the third embodiment of a present invention. In the third embodiment, it has the composition that an operation input unit 11 is added to the hardware configuration equivalent to the first embodiment described above. The operation input unit 11 is input means the use may operate to make the camera perform a particular function. The signal that the operation input unit 11 generates has a function that indicates that the proper photographing desired by the user has not been performed.

Figure 12:
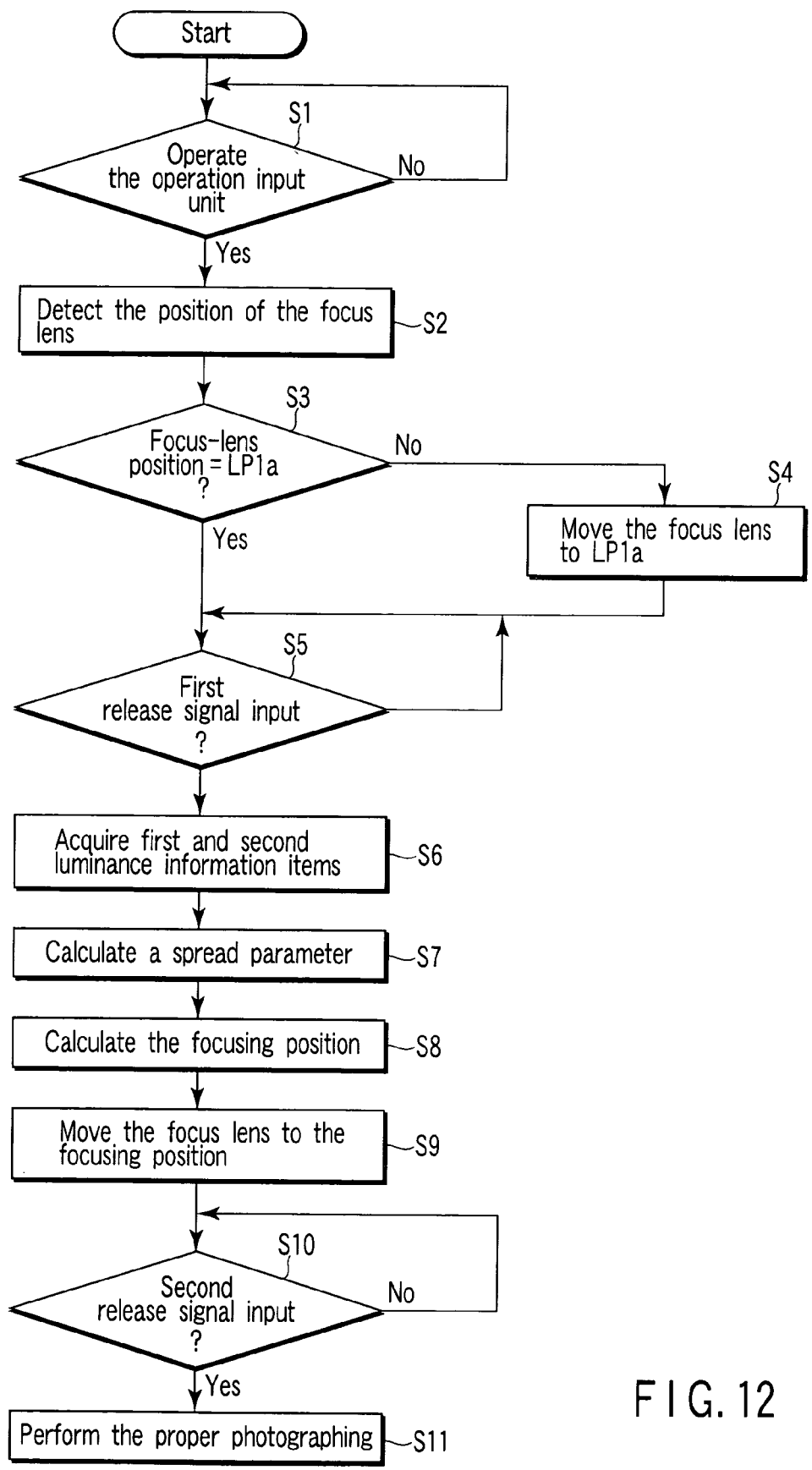
FIG. 12 is a flowchart explaining the operation of the third embodiment.
Figure 13:
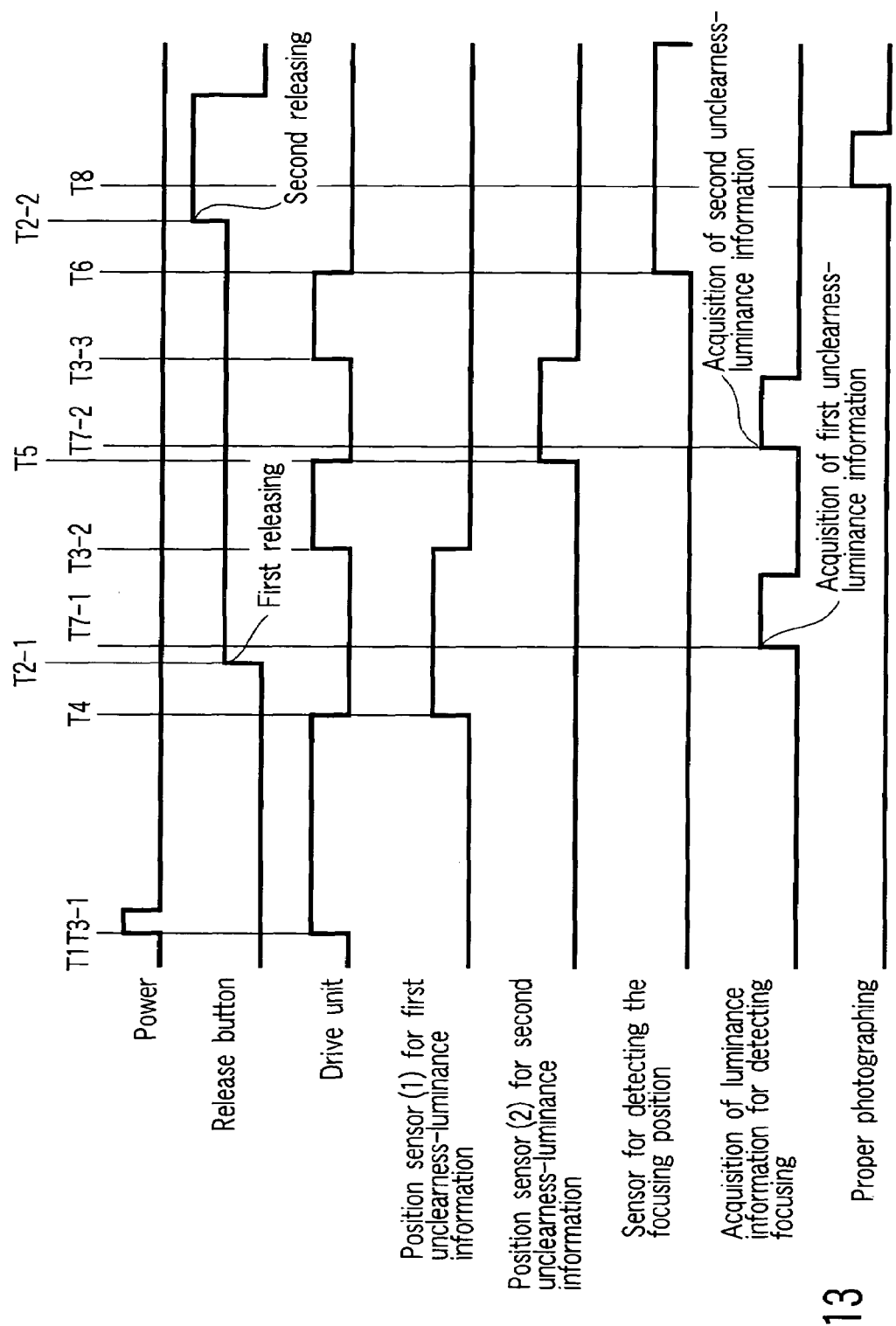
FIG. 13 is a timing chart explaining the operation of the third embodiment.

In the third embodiment, the operation input unit 11 is limited to an electric power switch. How this embodiment operates will be explained, with reference to the flowchart of FIG. 12 and the timing chart of FIG. 13.

The signal generated by the electric power switch, i.e., operation input unit 11, changes from OFF to ON, indicating that the user has started the proper photographing (Step S1). In optical-system control unit 6, a position sensor for first unclearness luminance information (FIG. 13), i.e., drive-unit-state detecting unit 9, detects the position that the focus lens 1 takes at this time (Step S2). It is determined whether the position the focus lens 1 takes at present is position LP1a designated when the command value P1a is input to the drive unit 8, the value P1a corresponding to the inflection point SG1a of the spread parameter shown in the table shown in FIG. 3 and described in conjunction with the first embodiment (Step S3).

If the focusing lens 1 is at position is LP1a, it is held at this position. It is then determined whether a focusing start signal (first release signal) has been input from the release button (not shown) (Step S5). On the other hand, if the focusing lens 1 is not at position LP1a, the drive unit 8 is driven. The focus lens 1 is thereby moved to position LP1a (Step S4). When the focus lens 1 reaches position LP1a, it is held at this position. It is then determined whether a focusing start signal has been input from the release button (not shown) (Step S5).

When the first release signal is input from a release button, indicating the start of focusing detection start, the first unclearness-luminance information is acquired. The sequence of acquiring the luminance information is just the same as in the first embodiment described above. Next, to acquire luminance information items, representing different degrees of unclearness, the focus lens 1 is driven to a predetermined position different from position LP1a. The output of a position sensor for second unclearness-luminance information detects that the focus lens 1 has been set at the predetermined position. The second unclearness-luminance information is acquired at the predetermined position. Thus, the first unclearness-luminance information and the second unclearness-luminance information are acquired. (Step S6).

After two luminance information items that differ in unclearness have been acquired, a spread parameter is calculated in the same way as explained in conjunction with the first embodiment (Step S7). The position, where the focus lens 1 should lie to achieve focusing in the imaging unit 2, i.e., focusing plane, is determined from the spread parameter, with reference to the table (Step S8). The focus lens 1 is set at the position thus determined (Step S9).

After the focus lens 1 is so set, a second release signal is input from a release button, indicating that proper photographing should be started (Step S10). The proper photographing is therefore started (Step S11). That is, photography is carried out to obtain an image of the object.

After the proper photographing has been performed for the first time, the position of the focus lens 1 is not controlled. In response to the next first release signal for initiating the second proper photographing, the focus lens 1 is moved to position LP1a as in the first embodiment.

In the sequence of steps, described above, the focus lens 1 is first set at position LP1a when the power switch, i.e., operation input unit 11, is turned on. The first unclearness-luminance information can therefore be immediately acquired when the focusing detection is started. The focus lens 1 may not be at position LP1a when the focusing detection is started. In this case, when a first release signal is input, the focus lens 1 must be driven to be moved to position LP1a, in order to acquire the first unclearness-information. Nonetheless, the time required for obtaining the first unclearness-luminance information T7-1 from the first release signal T2-1 shown in FIG. 13 can be shortened by performing the process in the fourth embodiment. As a result, the time required to detect focusing can be shortened.

In the third embodiment, the operation input unit 11 is limited to an electric power switch. Instead, the operation input unit 11 may be constituted by a release button, a touch panel using liquid crystal, or 10 the like.

In the third embodiment, the focus lens 1 is driven to acquire a plurality of unclearness-luminance information items as described above. Nonetheless, the diameter of the diaphragm may be changed to acquire luminance information items that differ in value. The lens may be made of fluid, whose refractive index is changed so as to acquire luminance information items for optical paths of different lengths. Further, a spread parameter may be calculated. It suffices to change at least one of the position of the lens, the diameter of diaphragm and the refractive index of the lens. Of course, two or more of these items may be changed. Only imaging unit 2 may be driven or the optical system 10 and the imaging unit 2 may be driven in interlock, as shown in the modifications of the first embodiment. Further, the configuration may be desired on the assumption that the camera is a single-lens reflex camera shown in FIG. 8.

In the third embodiment, the table of the spread parameters has an inflection point. Instead, the table may be one in which the approximated curve of the spread parameter has a minimum value. Further, the control-system storage unit 7 may store a plurality of tables, by using intermediate parameters.

As described above, in the embodiment, if the optical system 10 operates in interlock with the operation input unit 11, focusing desirable to the user can be detected.

Fourth Embodiment

In the third embodiment described above, the position control of, in particular, the focus lens 1 is not performed after the proper photographing has been finished. The focus lens 1 is moved to position of LP1*a* in accordance with the following first release signal input for performing next proper photographing.

Figure 14:
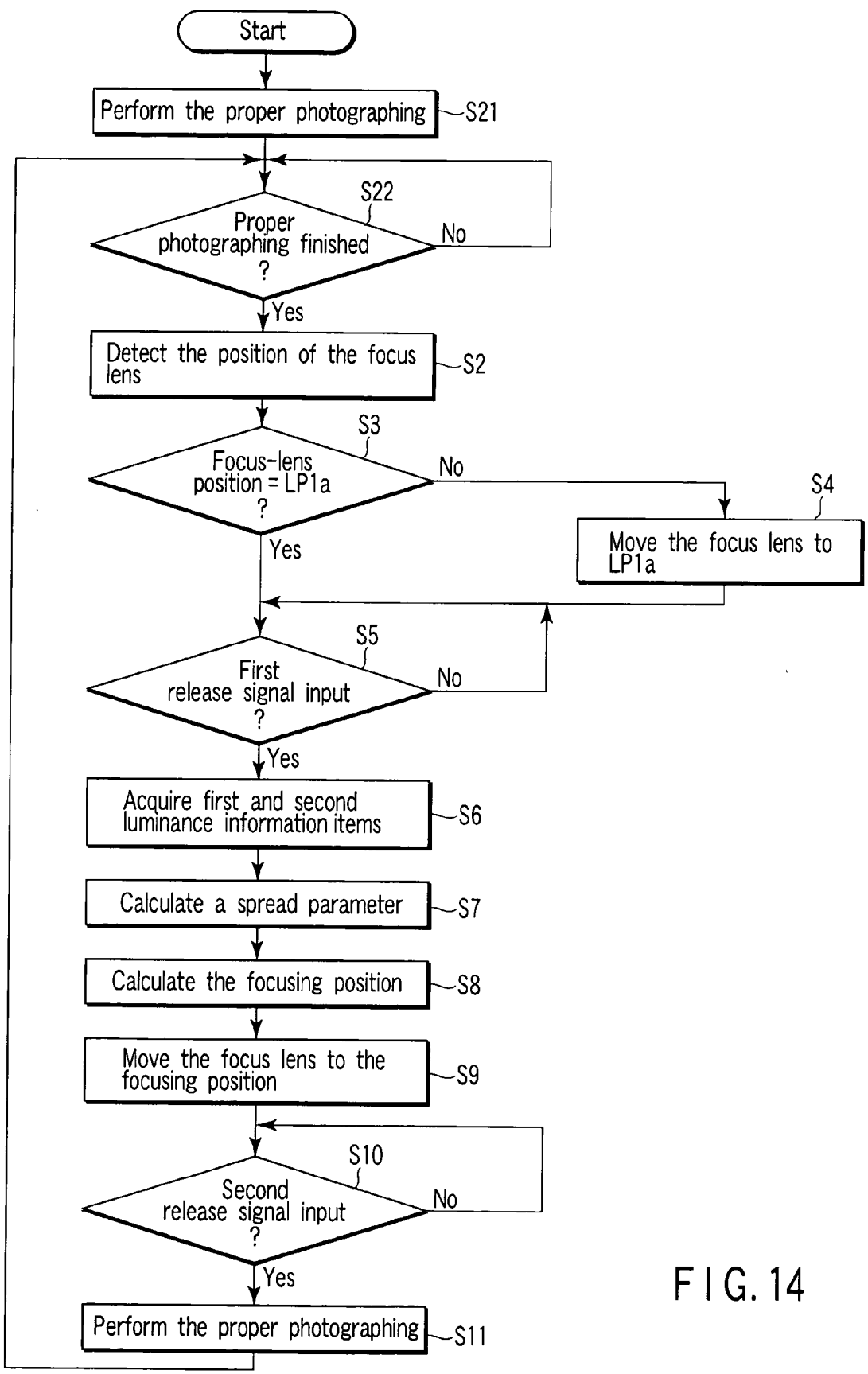
FIG. 14 is a flowchart for explaining the operation of a digital camera that incorporates and uses a apparatus and method of acquiring focusing information, according to a fourth embodiment of this invention.
Figure 15:
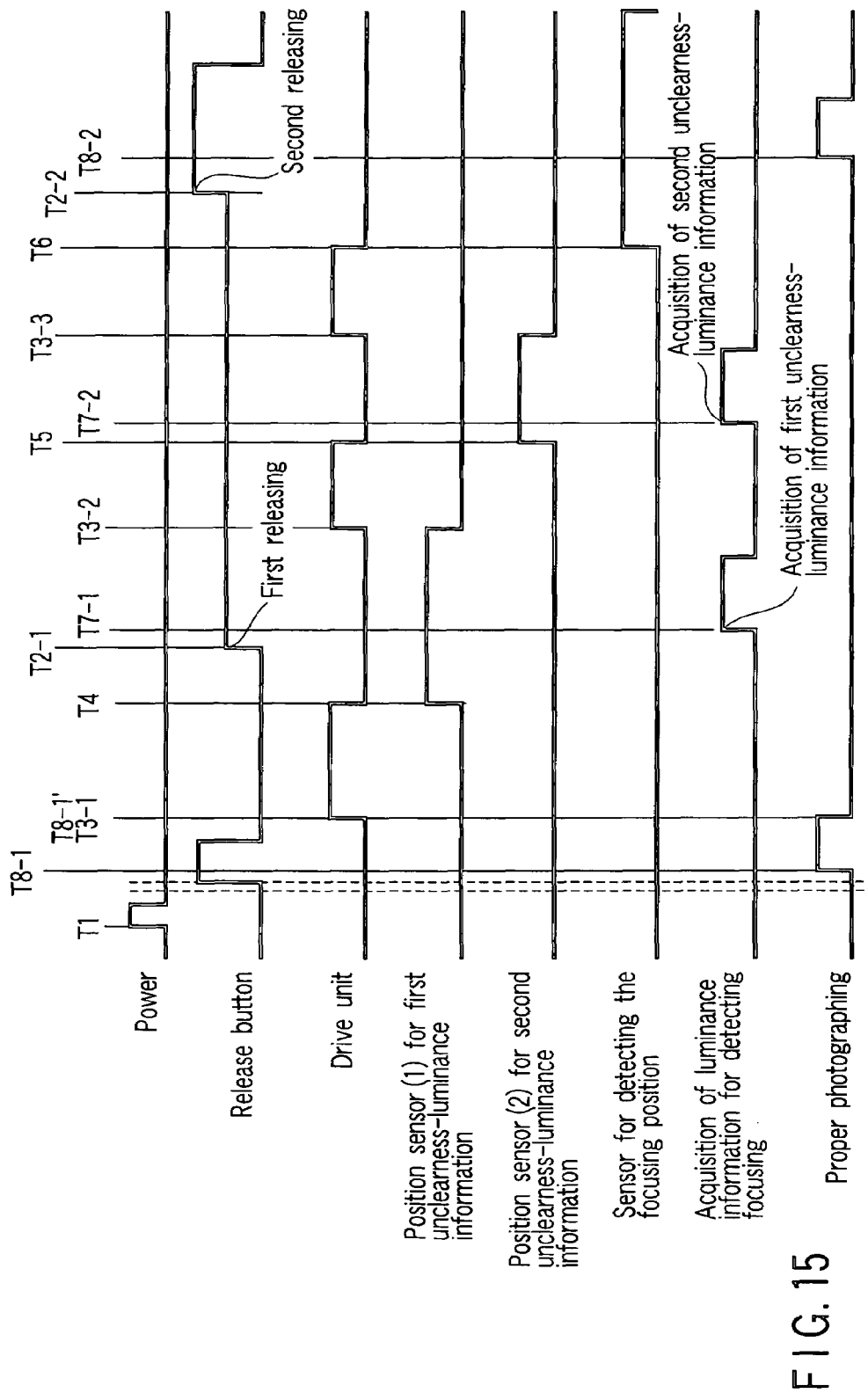
FIG. 15 is a timing chart explaining the operation of the fourth embodiment.

By contrast, in the fourth embodiment of this invention, the position of the focus lens 1 is controlled after the proper photographing has been finished. This will be explained, with reference to the flow chart of FIG. 14 and the timing chart of FIG. 15.

The user may starts proper photographing (Step S21). The sequence of proper photographing is completed (Step S22). Then, the optical-system control unit 6 causes a position sensor for first unclearness-luminance information, i.e., detecting unit 9, to detect the position that the focus lens 1 assumes at this time (Step S2). The sequence of process, from the image acquisition in the imaging unit 2 to the image recording in the image-processing-system storage unit 5, will be described. Alternatively, a sequence until the step of converting the image into a digital signal in the image-processing unit 3 or until the step of storing the image temporarily in the main control unit 4, may be described.

It is determined whether the position the focus lens 1 takes at present is position LP1*a* designated when the command value P1*a* is input to the drive unit 8, the value P1*a* corresponding to the inflection point SG1*a* of the spread parameter shown in the table shown in FIG. 3 and described in conjunction with the first embodiment (Step S3). If the focusing lens is at position is LP1*a*, it is held at this position. It is then determined whether a focusing start signal (first release signal) has been input from the release button (not shown) (Step S5). On the other hand, if the focusing lens is not at position LP1*a*, the focus lens 1 is moved to position LP1*a* (Step S4). When the focus lens 1 reaches position LP1*a*, it is held at this position. It is then determined whether a focusing start signal has been input from the release button (Step S5).

When the first release signal is input from a release button, indicating the start of focusing detection start, the first unclearness-luminance information is acquired. The sequence of acquiring the luminance information is just the same as in the first embodiment described above. Next, to acquire luminance information representing a different degree of unclearness, the focus lens 1 is driven to a predetermined position different from position LP1*a*. The output of a position sensor for second unclearness-luminance information detects that the focus lens 1 has been set at the predetermined position. The second unclearness-luminance information is acquired at the predetermined position (Step S6).

After two luminance information items that differ in unclearness have been acquired, a spread parameter is calculated in the same way as explained in conjunction with the first embodiment (Step S7). The optical-system control unit 6 calculates, from the spread parameter, the position, where the focus lens 1 should lie to achieve focusing in the imaging unit 2, i.e., focusing plane, with reference to the table (Step S8). The focus lens 1 is set at the position thus determined (Step S9). After the focus lens 1 is so set, a second release signal is input from a release button, indicating that proper photographing should be started (Step S10). The proper photographing is therefore started (Step S11). That is, photography is carried out to obtain an image of the object. Thereafter, the process returns to Step S22 and the above-mentioned process is repeated.

In the sequence of process steps, described above, the focus lens 1 is set at position LP1*a* when the proper photographing is completed. The first unclearness-luminance information can therefore be immediately acquired when the focusing detection is started. The focus lens 1 may not be at position LP1*a* when the focusing detection is started. In this case, when a first release signal is input, the focus lens 1 must be driven to be moved to position LP1*a*, in order to acquire the first unclearness-luminance information. Nonetheless, the time required for obtaining the first unclearness-luminance information T7-1 from the first release signal T2-1 shown in FIG. 15 can be shortened by performing the process in the fourth embodiment. As a result, the time required to detect focusing can be shortened.

In the fourth embodiment, as described above, the focus lens 1 is driven to acquire a plurality of unclearness-luminance information items, as described above. Nonetheless, the diameter of the diaphragm may be changed, to acquire luminance information items that are different in value. Alternatively, the lens may be made of fluid and the refractive index of the fluid may be changed, thereby to acquire luminance information items for optical paths of different lengths. In either case, the spread parameter is calculated. It suffices to change only one of the position of the diaphragm and the refractive index of the lens. Of course, two or more of these items may be changed at the same time. Only imaging unit 2 may be driven or the optical system 10 and the imaging unit 2 may be driven in interlock, as shown in the modifications of the first above-mentioned embodiment. Further, the configuration may be desired on the assumption that the camera is a single-lens reflex camera shown in FIG. 8.

In the fourth embodiment, the table of the spread parameters has an inflection point. Instead, the table may be one in which the approximated curve of the spread parameter has a minimum value. Further, the control-system storage unit 7 may store a plurality of tables, by using intermediate parameters.

As described, the time that elapses until the next proper photographing can be shortened in the present embodiment.

The present invention has been described, with reference to some embodiments. The invention is not limited the embodiments, nonetheless. Various changes and modifications can, of course, be made within the scope and spirit of this invention.

Needless to say, the present invention can of course be applied to, for example, film-based cameras, in the same way as to digital cameras as explained above.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for acquiring focusing information, comprising:
   an optical system configured to focus light coming from an object, at a predetermined position, in order to photograph the object and acquire a focused image of the object;
   a luminance-information acquiring unit configured to acquire luminance information items about corresponding regions of at least two of a plurality of images which differ in unclearness and which have been formed by the light that has passed through at least one part of the optical system;
   a control unit configured to control a state of at least one of the optical system and the luminance-information acquiring unit in accordance with an input command value;
   a spread-parameter calculating unit configured to calculate a spread parameter from a plurality of luminance information items acquired by the luminance-information acquiring unit;
   a storage unit configured to store a table that shows a relation between spread parameters and command values supplied to the control unit to acquire a focused image of the object, and information that designates a command value corresponding to an inflection point on an approximated curve showing the relation that the spread parameters have with the command values; and
   a command-outputting unit configured to output the command value to the control unit in order to acquire a focused image of the object, by using the spread parameter calculated by the spread-parameter calculating unit and the table stored in the storage unit,
   at least one of the luminance information items acquired by the luminance-information acquiring unit having been acquired under a specific condition established by inputting to the control unit the command value corresponding to the inflection point that is designated on the basis of the information stored in the storage unit.

2. The apparatus for acquiring focusing information according to claim 1, wherein the optical system includes a diaphragm and a photographing lens.

3. The apparatus for acquiring focusing information according to claim 2, wherein a state of the optical system controlled by the control unit is controlled in accordance with one of a diameter of the diaphragm and a length of an optical path that the photographing lens incorporated in the optical system has with respect to the object.

4. The apparatus for acquiring focusing information according to claim 1, wherein the luminance-information acquiring unit acquires luminance of a specific region of an image.

5. The apparatus for acquiring focusing information according to claim 1, wherein the luminance-information acquiring unit is an integrated unit of photoelectric transducer elements.

6. The apparatus for acquiring focusing information according to claim 1, wherein the luminance-information acquiring unit is an imaging element.

7. The apparatus for acquiring focusing information according to claim 1, wherein a state of the luminance-information acquiring unit controlled by the control unit is controlled in accordance with a length of an optical path between the object and the luminance-information acquiring unit.

8. The apparatus for acquiring focusing information according to claim 1, wherein the table stored in the storage unit is a table showing command values related to spread parameters.

9. The apparatus for acquiring focusing information according to claim 1, wherein the table finally shows a relation between the command values supplied to the control unit and the spread parameters, when a plurality of tables are referred to.

10. The apparatus for acquiring focusing information according to claim 1, wherein the information that designates a command value corresponding to an inflection point includes one of the command value corresponding to the inflection point and a discrete value from which the command value can be inferred.

11. The apparatus for acquiring focusing information according to claim 1, wherein the optical system assumes the specific condition before the optical system is set in a condition that a focused image is acquirable.

12. The apparatus for acquiring focusing information according to claim 1, wherein the optical system assumes the specific condition before the optical system is set in a condition for acquiring the focused image.

13. The apparatus for acquiring focusing information according to claim 1, further comprising an operation input unit, and wherein operation of the operation input unit is detected and the specific condition is set in interlock with the operation of the operation input unit.

14. The apparatus for acquiring focusing information according to claim 1, wherein the specific condition is set after previous focused photographing.

15. The apparatus for acquiring focusing information according to claim 1, wherein the control unit includes:
   a drive unit configured to drive at least one of the optical unit and the luminance-information acquiring unit; and
   a drive-unit state detecting unit configured to detect the position of the drive unit.

16. An apparatus for acquiring focusing information, comprising:
   an optical system configured to focus light coming from an object, at a predetermined position, in order to photograph the object and acquire a focused image of the object;
   a luminance-information acquiring unit configured to acquire luminance information items about corresponding regions of at least two of a plurality of images which differ in unclearness and which have been formed by the light that has passed through at least one part of the optical system;
   a control unit configured to control a state of at least one of the optical system and the luminance-information acquiring unit in accordance with an input command value;
   a spread-parameter calculating unit configured to calculate a spread parameter from a plurality of luminance information items acquired by the luminance-information acquiring unit;
   a storage unit configured to store a table that shows a relation between spread parameters and command values supplied to the control unit to acquire a focused image of the object, and information that designates a command value corresponding to a point on one of an approximated curve and an approximate line showing the relation that the spread parameter has with the command values, the spread parameter having a minimum absolute value at the point; and a command-outputting unit configured to output the command value to the control unit in order to acquire a focused image of the object, by using the spread parameter calculated by the spread-parameter calculating unit and the table stored in the storage unit, at least one of the luminance information items acquired by the luminance-information acquiring unit having been acquired under a specific condition established by inputting to the control unit the command value corresponding to the point at which the spread parameter designated on the basis of the information stored in the storage unit has the minimum absolute value.

17. A method of acquiring focusing information, comprising:

acquiring luminance information items about corresponding regions of at least two of a plurality of images which differ in unclearness and which have been formed by light that has passed through at least one part of an optical system which focuses light coming from an object, at a predetermined position, in order to photograph the object and acquire an focused image of the object;

calculating a spread parameter from a plurality of luminance information items thus acquired;

storing beforehand a table that shows a relation between spread parameters and command values supplied to a control unit to acquire a focused image of the object, and information that designates a command value corresponding to an inflection point on an approximated curve showing the relation that the spread parameters have with the command values, the control unit being configured to control a state of at least one of the optical system and the acquiring luminance information items, in accordance with an input command value; and outputting the command value to the control unit in order to acquire a focused image of the object, by using the spread parameter thus calculated and the table stored beforehand, at least one of the luminance information items acquired in the acquiring luminance information items being an item acquired under a specific condition established by inputting to the control unit the command value corresponding to the inflection point that is designated on the basis of the information stored beforehand.

18. A method of acquiring focusing information, comprising:

acquiring luminance information items about corresponding regions of at least two of a plurality of images which differ in unclearness and which have been formed by light that has passed through at least one part of an optical system which focuses light coming from an object, at a predetermined position, in order to photograph the object and acquire an focused image of the object;

calculating a spread parameter from a plurality of luminance information items thus acquired;

storing beforehand a table that shows a relation between spread parameters and command values supplied to a control unit to acquire a focused image of the object, and information that designates a command value corresponding to a point on one of an approximated curve and an approximate line showing the relation that the spread parameters have with the command values, the spread parameter having a minimum absolute value at the point, and the control unit being configured to control a state of at least one of the optical system and the acquiring luminance information items, in accordance with an input command value; and outputting the command value to the control unit in order to acquire a focused image of the object, by using the spread parameter thus calculated and the table stored beforehand, at least one of the luminance information items acquired in the acquiring the luminance information items having been acquired under a specific condition established by inputting to the control unit the command value corresponding to the point at which the spread parameter designated on the basis of the information stored beforehand has the minimum absolute value.

* * * * *